(12) United States Patent
Lee et al.

(10) Patent No.: US 7,032,437 B2
(45) Date of Patent: Apr. 25, 2006

(54) DIRECTED GROWTH OF NANOTUBES ON A CATALYST

(75) Inventors: Randall Lee, Georgetown, MA (US); Thomas Owen Mitchell, Fort Collins, CO (US); Johannes Jacobus Lambertus Mulders, Eindhoven (NL)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 10/763,061

(22) Filed: Jan. 22, 2004

(65) Prior Publication Data

US 2004/0255652 A1    Dec. 23, 2004

Related U.S. Application Data

(63) Continuation-in-part of application No. 10/261,084, filed on Sep. 30, 2002, now abandoned, which is a continuation of application No. 09/657,428, filed on Sep. 8, 2000, now Pat. No. 6,457,350.

(51) Int. Cl.
    *G02B 5/28*    (2006.01)
(52) U.S. Cl. .......................... 73/105; 250/306; 250/307
(58) Field of Classification Search ................. 73/105; 250/306, 307
    See application file for complete search history.

(56) References Cited

U.S. PATENT DOCUMENTS

| 5,307,693 | A | 5/1994 | Griffith et al. |
| 5,703,979 | A | 12/1997 | Filas et al. |
| 5,756,887 | A | 5/1998 | Bryson, III et al. |
| 5,824,470 | A | 10/1998 | Baldeschwieler et al. |
| 6,159,742 | A | 12/2000 | Lieber et al. |
| 6,346,189 | B1 | 2/2002 | Dai et al. |
| 6,743,408 | B1 * | 6/2004 | Lieber et al. ............ 423/447.1 |
| 6,864,481 | B1 * | 3/2005 | Kaito et al. ................. 250/306 |
| 6,871,528 | B1 * | 3/2005 | Schlaf et al. ................. 73/105 |

FOREIGN PATENT DOCUMENTS

WO    WO98/05920    2/1998

(Continued)

OTHER PUBLICATIONS

Cheung et al., "Growth and Fabrication with Single-Walled Carbon Nanotube Probe Microscopy Tips", Apply Physics Letters, vol. 76, No. 21, May 22, 2000, pp. 3136-3138.

(Continued)

*Primary Examiner*—Michael Cygan
(74) *Attorney, Agent, or Firm*—Michael O. Scheinberg; David Griner (57) ABSTRACT

A method of fabricating a nanotube probe tip and the resultant probe tip, particularly for use in an atomic force microscope. A moderately sharply peaked support structure has its tip cut or flattened to have a substantially flat end of size of about 20 to 200 nm across. The support structure may be formed by etching a conical end into a silica optical fiber. Nickel or other catalyzing metal such as iron is directionally sputtered onto the flat end and the sloped sidewalls of the support structure. The nickel is anisotropically etched to remove all the nickel from the sidewalls but leaving at least 15 nm on the flat end to form a small nickel dot. A nanotube is then grown with the nickel catalyzing its growth such that only a single nanotube forms on the nickel dot and its diameter conforms to the size of the nickel dot. In another preferred embodiment of the invention, a catalyst material can be directly deposited on to the probe end using charged particle beam deposition, such as electron beam deposition.

34 Claims, 4 Drawing Sheets

FOREIGN PATENT DOCUMENTS

WO      WO00/09443      2/2000

OTHER PUBLICATIONS

Cheung et al., "Carbon Nanotube Atomic Force Microscopy Tips: Direct Growth by Chemical Vapor Deposition and Application to High-Resolution Imagining", PNAS, vol. 97, No. 8. Apr. 11, 2000, pp. 3809-3813.

Ren et al., "Synthesis of Large Arrays of Well-Aligned Carbon Nanotubes on Glass", Science, vol. 282, Nov. 6, 1998, pp. 110-112.

Stevens et al., "Carbon Nanotubes as Probes for Atomic Force Microscopy", Nanotechnology, vol. 11, Mar. 2000, pp. 1-5.

Huang et al., "Growth of Highly Oriented Carbon Nanotubes by Plasma-Enhanced Hot Filament Chemical Vapor Deposition", Apply Physics Letter, vol. 73, No. 26, Dec. 28, 1998, pp. 3845-3847.

Dai et al., "Nanotubes as Nanoprobes in Scanning Probe Microscopy", Nature, vol. 384, Nov. 14, 1996, pp. 147-150.

Kong et al., "Synthesis of Individual Single-Walled Carbon Nanotubes on Patterned Silicon Wafers", Nature, vol. 395, Oct. 29, 1998, pp. 878-881.

EMTECH, Technical Brief: Sputter Coating Incorporating Emitch K500, K550, K575 and K675X, EMITECHK575, Mar. 3, 1999, pp. 1-8.

Boisen et al., "AFM Probes with Directly Fabricated Tips", J. Micromech. Microeng., vol. 6, 1996, pp. 58-60.

Marco Tortonese, "Cantilevers and Tips for Atomic Force Microscopy" IEEE Engineering in Medicine and Biology, Mar./Apr. 1997, pp. 28-33.

Ren et al., "Growth of a Singe Freestanding Multiwall Carbon Nanotube on Each Nanonickel Dot", Applied Physics Letters, vol. 75, No. 8, Aug. 23, 1999, pp. 1086-1088.

CRC Handbook of Metal Etchants, 1991, pp. 857-875.

* cited by examiner

DIRECTED GROWTH OF NANOTUBES ON A CATALYST

This application is a continuation in part of U.S. patent application Ser. No. 10/261,084, filed Sep. 30, 2002, now abandoned which was a continuation of U.S. patent application Ser. No. 09/657,428, filed Sep. 8, 2000 and issued Oct. 1, 2002 as U.S. Pat. No. 6,457,350. Both parent applications are hereby incorporated by reference.

TECHNICAL FIELD OF THE INVENTION

The invention relates generally to mechanical probe tips such as those used in atomic force microscopy. In particular, the invention relates to a carbon nanotube grown directly on a pointed end of a probe.

BACKGROUND AND SUMMARY OF THE INVENTION

Atomic force microscopes (AFMs) have been recently developed for mechanically profiling small features, for example, determining critical dimensions (CDs) of via holes in semiconductor integrated circuits. Such holes have depths of about 1 μm and widths that are being pushed to 180 nm and below. For detailed measurement of the feature, an exceedingly fine probe tip is disposed on the end of a cantilever overlying the feature. In the pixel mode of operation, the probe tip is successively positioned at points on a line above and traversing the feature being probed. The cantilever lowers the probe tip until it encounters the surface, and both the horizontal position and the vertical position at which the probe meets the surface are recorded. A series of such measurements provide the desired microscopic profile. An example of such an atomic force microscope is the Stylus Nanoprobe SNP available from Surface/Interface, Inc. of Sunnyvale, Calif. It employs technology similar to the rocking balanced beam probe disclosed by Griffith et al. in U.S. Pat. No. 5,307,693 and by Bryson et al. in U.S. Pat. No. 5,756,887.

Figure 1:
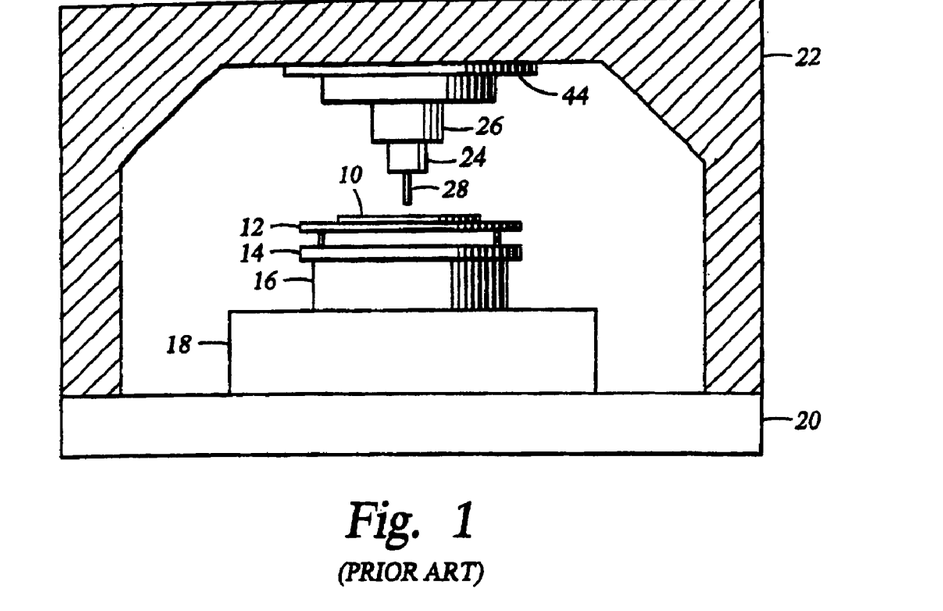
FIG. 1 is a schematic elevational view of a prior art rocking beam atomic force microscope.

Such a tool is schematically illustrated in the side view of FIG. 1. A few more details are found in U.S. patent application Ser. No. 09/354,528, filed Jul. 15, 1999 and incorporated herein by reference in its entirety. A wafer 10 or other sample to be examined is supported on a support surface 12 supported successively on a tilt stage 14, an x-slide 16, and a y-slide 18, all of which are movable along their respective axes so as to provide horizontal two-dimensional and tilt control of the wafer 10. Although these mechanical stages provide a relatively great range of motion, their resolutions are relatively coarse compared to the resolution sought in the probing. The bottom y-slide 18 rests on a heavy granite slab 20 providing vibrational stability. A gantry 22 is supported on the granite slab 20. A probe head 24 hangs in the vertical z-direction from the gantry 22 through an intermediate piezoelectric actuator 26 providing about 10 gm of motion in (x, y, z) by voltages applied across electrodes attached to the walls of a piezoelectric tube. A probe assembly with a tiny attached probe tip 28 projects downwardly from the probe head 24 to selectively engage the probe tip 28 with the top surface of the wafer 10 and to thereby determine its vertical and horizontal dimensions.

Figure 2:
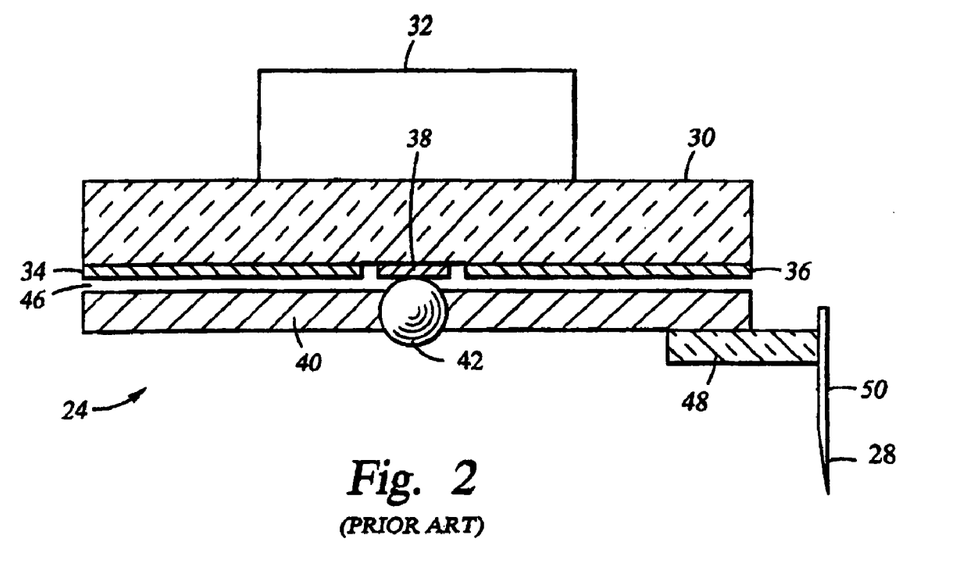
FIG. 2 is a cross-sectional side view of a portion of the prior art atomic force microscope of FIG. 1.

Principal parts of the probe head 24 of FIG. 2 are illustrated in the side view of FIG. 2. A dielectric support 30 fixed to the bottom of the piezoelectric actuator 26 includes on its top side, with respect to the view of FIG. 1, a magnet 32. On the bottom of the dielectric support 30 are deposited two isolated capacitor plates 34, 36 and two interconnected contact pads 38.

A beam 40 is medially fixed on its two lateral sides and is also electrically connected to two metallic and ferromagnetic ball bearings 42. The beam 40 is preferably composed of heavily doped silicon so as to be electrically conductive, and a thin silver layer is deposited on it to make good electrical contacts to die ball bearings. The two ball bearings 42 are placed on respective ones of the two contact pads 38 and generally between the capacitor plates 34, 36, and the magnet 32 holds the ferromagnetic bearings 42 and the attached beam 40 to the dielectric support 30. The attached beam 40 is held in a position generally parallel to the dielectric support 40 with a balanced vertical gap 46 of about 25 gm between the capacitor plates 34, 36 and the beam 40. Unbalancing of the vertical gap allows a rocking motion of about 25 gm. The beam 40 holds on its distal end a glass tab 48 to which is fixed a stylus 50 having the probe tip 52 projecting downwardly to selectively engage the top of the wafer 10 being probed.

Two capacitors are formed between the respective capacitor plates 34, 36 and the conductive beam 40. The capacitor plates 34, 36 and the two contact pads 38, commonly electrically connected to the conductive beam 40, are separately connected by three unillustrated electrical lines to three terminals of external measurement and control circuitry This servo system both measures the two capacitances and applies differential voltage to the two capacitor plates 34, 36 to keep them in the balanced position. When the piezoelectric actuator 26 lowers the stylus 50 to the point that it encounters the feature being probed, the beam 40 rocks upon contact of the probe tip 52 with the wafer 10. The difference in capacitance between the plates 34, 36 is detected, and the servo circuit attempts to rebalance the beam 40 by applying different voltages across the two capacitors, which amounts to a net force that the stylus 50 is applying to the wafer 10. When the force exceeds a threshold, the vertical position of the piezoelectric actuator 26 is used as an indication of the depth or height of the feature.

This and other types of AFMs have control and sensing elements more than adequate for the degree of precision for profiling a 180 nm×1 μm hole. However, the probe tip presents a challenge for profiling the highly anisotropic holes desired in semiconductor fabrication as well as for other uses such as measuring DNA strands and the like. The probe tip needs to be long, narrow, and stiff. Its length needs to at least equal the depth of the hole being probed, and its width throughout this length needs to be less than the width of the hole. A fairly stiff probe tip reduces the biasing introduced by probe tips being deflected by a sloping surface.

One popular type of probe tip is a shaped silica tip, such as disclosed by Marchman in U.S. Pat. Nos. 5,395,741 and 5,480,049 and by Filas and Marchman in U.S. Pat. No. 5,703,979. A thin silica fiber has its end projecting downwardly into an etching solution. The etching forms a tapered portion near the surface of the fiber, and, with careful timing, the deeper portion of the fiber is etched to a cylinder of a much smaller diameter. The tip manufacturing is relatively straightforward, and the larger fiber away from the tip provides good mechanical support for the small tip. However, it is difficult to obtain the more desirable cylindrical probe tip by the progressive etching method rather than the tapered portion alone. Furthermore, silica is relatively soft so that its lifetime is limited because it is continually being forced against a relatively hard substrate.

One promising technology for AFM probe tips involves carbon nanotubes which can be made to spontaneously grow normal to a surface of an insulator such as glass covered with a thin layer of a catalyzing metal such as nickel. Carbon nanotubes can be grown to diameters ranging down to 5 to 20 nm and with lengths of significantly more than 1 μm. Nanotubes can form as single-wall nanotubes or as multiple-wall nanotubes. A single-wall nanotube is a cylindrically shaped, atomically thin sheet of carbon atoms arranged in a hexagonal crystalline structure with a graphitic type of bonding. In multiple-wall nanotubes, multiple-walls bond to each other with a tetrahedral bonding structure, which is exceedingly robust. The modulus of elasticity for carbon nanotubes is significantly greater than that for silica. Thus, nanotubes offer a very stiff and very narrow probe tip well suited for atomic force microscopy. Furthermore, carbon nanotubes are electrically conductive so that they are well suited for scanning tunneling microscopy and other forms of probing relying upon passing a current through the probe tip. Dai et al. describe the manual fabrication of a nanotube probe tip in "Nanotubes as nanoprobes in scanning probe microscopy," Nature, vol. 384, 14 Nov. 1996, pp. 147–150.

Typically, nanotubes suffer from the disadvantage that a large number of them simultaneously form on a surface producing either a tangle or a forest of such tubes, as is clearly illustrated by Ren et al. in "Synthesis of large arrays of well-aligned carbon nanotubes on glass," Science, vol. 282, 6 Nov. 1998, pp. 1105–1107. The task then remains to affix one nanotube to a somewhat small probe tip support. Dai et al. disclose an assembly method in which they coat the apex of a silicon pyramid at the probe end wit adhesive. The coated silicon tip was then brushed against a bundle of nanotubes, and a single nanotube can be pulled from the bundle. This method is nonetheless considered expensive and tedious requiring both optical and electron microscopes. Additionally, there is little control over the final orientation of the nanotube, certainly not to the precision needed to analyze semiconductor features. Cheung et al. describe another method of growing and transferring nanotubes in "Growth and fabrication with single-walled carbon nanotube probe microscopy tips," Applied Physics Letters, vol. 76, no. 21, 22 May 2000, pp. 3136–3138. However, they either produce poor directional control with a very narrow, single nanotube or require a complex transfer mechanism with nanotube bundles.

Ren et al. describe a method of growing isolated nanotubes in "Growth of a single freestanding multiwall carbon nanotube on each nanonickel dot," Applied Physics Letters, vol. 75, no. 8, 23 Aug. 1999. pp. 1086–1088. They deposit 15 nm of nickel on silicon and pattern it into a grid of nickel dots having sizes of somewhat more than 100 nm. Plasma-enhanced chemical vapor deposition using acetylene and ammonia produces a single nanotube on each dot having an obelisk shape with a base diameter of about 150 nm and a sharpened tip. However, Ren et al. do not address the difficult problem of transferring such a nanotube, which they describe as being tightly bonded to the nickel, from the nickel-plated substrate to a probe end.

Cheung et al. disclose another method of growing isolated nanotubes in "Carbon nanotube atomic force microscopy tips: Direct growth by chemical vapor deposition and application to high-resolution imaging," Proceedings of the National Academy of Sciences, vol. 97, no. 8, 11 Apr. 2000, pp. 3809–3813. They etch anisotropic holes in a silicon tip and deposit the catalyzing iron or iron oxide in the bottom of the holes. The carbon nanotubes grow out of the holes. However, growth in such restricted geometries is considered to be disadvantageous and to favor single-wall rather than multiple-wall nanotubes. Further, this method provides only limited control over the number and size of the nanotubes being grown.

Accordingly, a more efficient method is desired for forming a probe tip having a single carbon nanotube, or a controlled number of nanotubes. Furthermore, the structure of the probe end and probe tip should facilitate assembly of the probe and contribute to its robustness.

SUMMARY OF THE INVENTION

It is an object of the invention, therefore, is to provide an improved method of forming a structure, such as an AFM probe tip assembly, having a controlled number of nanotubes attached to the structure. A preferred embodiment of the invention described and claimed herein comprises a probe support shaped to have sloping sides and a generally planar or flat end, that is, in the shape of sloping mesa. Nickel or some other catalyzing material capable of catalyzing the growth of carbon nanotubes is directionally deposited onto the probe end. The catalyzing material is then isotropically so as to leave sufficient catalyzing material on the mesa top to catalyze the growth of a single carbon nanotube. Typically, the nanotube grows with a bottom diameter approximately equal to that of the catalyst dot on top of the mesa.

In another preferred embodiment of the present invention, the probe support is formed so that the flat end is inclined, that is, the flat end is not perpendicular to the longitudinal axis of the probe support.

In still another preferred embodiment of the invention, a catalyst material can be directly deposited on to the probe end using charged particle beam deposition, such as electron beam deposition.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

Preferred embodiments of the invention allow the fabrication of a single carbon nanotube, or a controlled number of nanotubes, on a narrow support structure well suited for easy attachment to a probe of an atomic force microscope (AFM) or other type of microprobe.

In one preferred embodiment of the invention described and claimed herein, a probe end is shaped to have sloping sides and a generally flat end, that is, in the shape of sloping mesa. The diameter of the mesa top is preferably in the range of 20 to 300 nm. Nickel or some other material that catalyzes the growth of carbon nanotubes is directionally deposited onto the probe end. Because of the geometry, the thickness of the deposited nickel, as measured from the underlying surface is greater on the mesa top than on the mesa sides. The nickel is then isotropically etched for a time sufficient to remove the nickel from the mesa sides but to leave sufficient nickel on the mesa top to catalyze the growth of a single carbon nanotube. Typically, the nanotube grows with a bottom diameter approximately equal to that of the nickel dot on top of the mesa.

Figure 3:
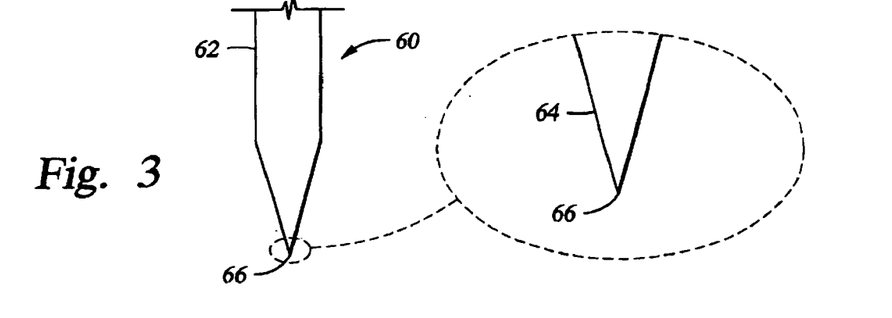
FIG. 3 is a cross-sectional side view of a probe end having a tapered tip and available in the prior art, the figure including an exploded view of the sharp probe end.

According to this embodiment of the invention, a support structure 60, illustrated inside view in FIG. 3, is formed having a relatively massive upper portion 62 and a shaped tip 64 with a sharp point 66 having a curvature of less than about 50 nm. On the scale of probe tips, the upper portion 62 and the shaped tip 64 have a common longitudinal axis. The support structure 60 is illustrated with the orientation of its intended final use in a microscope overlying a sample being probed. The support structure 60 may be the quartz (silica) fiber of Marchman in which the shaped tip 64 is formed by placing an end of a 125 μm fiber in a bath of hydrofluoric acid (HF) overlaid by a layer of oil and leaving it in that position for a sufficiently long period that the fiber end is etched to a point. That is, the etching continues to completely etch away the cylinder of the Marchman tip. The point at which the HF completely dissolves the fiber defines the sharp point 66. Alternatively, the shaped tip can be defined by polishing and grinding, particularly for sapphire fiber. The shaped tip 64 need not have a strictly conical shape, but it is advantageous that there be an sloping portion between the sharp point 66 and the relatively massive fiber 62 to provide mechanical stability in the finally assembled probe.

Figure 4:
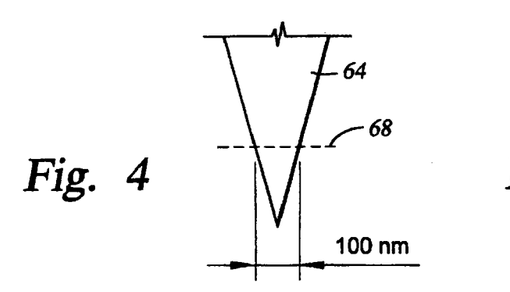
FIG. 4 is a cross-sectional view showing the position of a sectioning of the probe end of FIG. 2.

The support structure 60 is then subjected to focused ion beam (FIB) milling along a line 68, illustrated in the cross-sectional view of FIG. 4, that in this embodiment is transverse to the axis of the support structure and passes through a predetermined width of the shaped tip 64. The predetermined width closely corresponds to the width of the final carbon nanotube and may be, for example, 100 nm. FIB milling is a well-known technique for micromachining and relies upon a focused beam typically of gallium ions to mill structures with a resolution down to about 5 nn. Such a system is the FIB 200TEM available from FEI Company of Hillsboro, Oreg. Other milling techniques could be used, for example other types of charged particle beam milling, but FIB milling is effective and economical.

Figure 5:
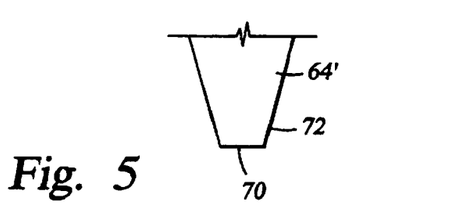
FIG. 5 is a cross-sectional view showing the sectioned probe end.
Figure 6:
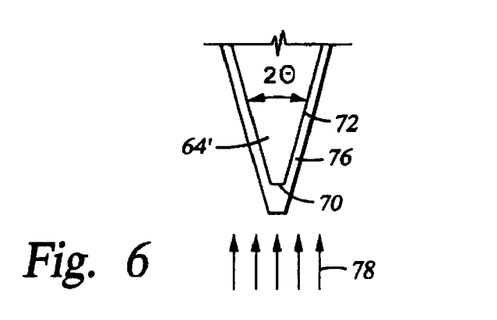
FIG. 6 is a cross-sectional view showing the directional deposition of nickel or other catalyzing material.

The milling produces a shaped tip 64', illustrated in the cross-sectional view of FIG. 5, having a flat end 70 and sloping sidewalls 72. Then, as illustrated in the cross-sectional view of FIG. 6, a film 76 of nickel or other catalyzing metal is then directionally deposited onto the probe tip 64', preferably by sputtering metal atoms along the longitudinal axis of the shaped tip 64'. The thickness of the deposition, as measured along the longitudinal axis, is substantially constant between the area of the flat end 70 and the sloping sidewalls 72 of the shaped tip 64'. However, the thickness, as measured at a perpendicular to the underlying surface, is substantially thicker in the area overlying the flat 70 than in the areas overlying the sloping sidewalls 72. The effect is primarily geometric. If the probe tip has a tip angle $2\theta$ and the deposition is totally anisotropic, then the sidewall thickness is $\sin \theta$ times the end thickness. For example, if $2\theta=31.3°$, then the sidewall thickness is 27% of the end thickness. The sputtering may be performed in an ion sputtering system using a nickel target. Such a system is the Model 681 High Resolution Ion Coater from Gatan of Pleasanton, Calif. Other types of deposition are possible, such as molecular beam techniques usually associated with molecular beam epitaxy.

Figure 7:
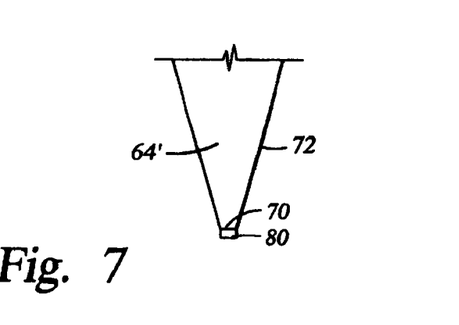
FIG. 7 is a cross-sectional view showing a nickel dot formed only on the sectioned end of the probe end.

As illustrated in the cross-sectional view of FIG. 7, the nickel-plated shaped tip 64' is subjected to isotropic etching of the nickel for a time just sufficient to remove the nickel from the tip sidewalls 72 but leaving a nickel dot 80 over the tip end 70. A minimum thickness of approximately 15 to 20, preferably 30 to 40 nm, of nickel is desired in the area of the nickel dot 80 to catalyze the nanotube growth. Assuming the lower value of 15 nm and a tip angle $2\theta$ of 31.3°, about 27 nm of nickel needs to be anisotropically deposited over the area of the tip end 70 to account for the end nickel being thinned during removal of the sidewall nickel, which has an initial thickness of 7 nm. The etching time obviously needs to be controlled so that it continues long enough to remove the sidewall nickel while leaving sufficient of the end nickel.

It may be advantageous to oxidize the nickel prior to etching, and in any case nickel will typically have an oxidized surface layer upon any exposure to air. Any number of isotropic wet etchants for nickel and nickel oxide are known, as tabulated in CRC Handbook of Metal Etchants, eds. Walker et al., CRC Press, 1991, pp. 857–875 and include dilute nitric and sulfuric acids for nickel and ammonium hydroxide for nickel oxide.

Figure 8:
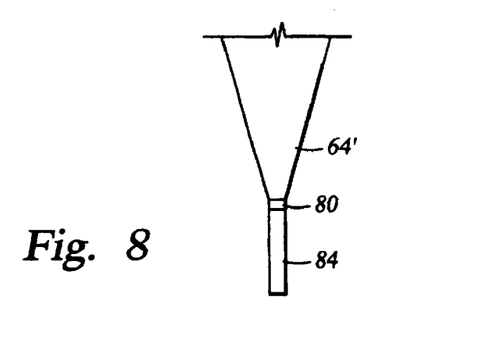
FIG. 8 is a cross-sectional view showing a nanotube grown on the nickel dot.

The nickel dot 80 provides a small catalyzing area for the growth of a single carbon nanotube 84 illustrated in cross-sectional view in FIG. 8. Ren et al. and Cheung et al. describe the process for selective growth of nanotubes in the above cited references. The diameter of the nanotube 34 corresponds generally to the diameter or average lateral extent of the flattened end 70 of the shaped tip 64'. For a non-circular end 80, the nanotube diameter is approximately equal to the minimum lateral extent of the end.

It has proven difficult to control the length to which nanotubes grow. Accordingly, it may be necessary to perform an additional step of cutting the carbon nanotube to a prescribed length, for example, by FIB milling.

The probe structure illustrated in FIG. 8 includes a relatively rugged support structure 62, illustrated in FIG. 3, which is ready to be mounted onto the probe of the AFM or other microscope using a stylus.

The method described above requires that the sidewalls of the shaped tip slope away from the tip end. To achieve the required differential but isotropic etching, the slope is preferably at least 60° from the plane. The differential coating works even with a slope of 90°, that is, vertical sidewalls. Such a shape may be produced by FIB milling, for example, a cylinder having a diameter of 100 nm or a similarly sized rectangular post into the tip 66 at the end of the conical tip 64 prior to nickel deposition.

Figure 9:
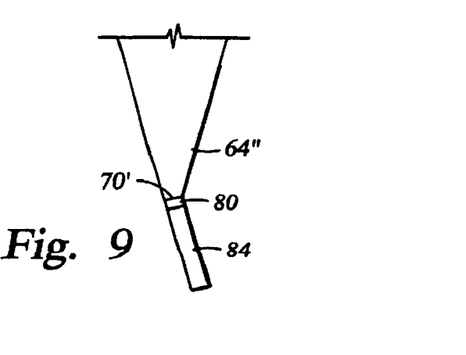
FIG. 9 is a cross-sectional view showing a second embodiment of the invention.

The embodiment described above produces a carbon nanotube extending along the axis of the conical tip. However, in another embodiment illustrated in the cross-sectional view of FIG. 9, a shaped tip 64" is formed by milling the conical tip 64 to have an inclined flat end 70'. That is, the flat end 70' is not perpendicular to the axis of the fiber or the shaped tip 64". The deposition of the nickel 80 and the growth of the carbon nanotube 84 are then performed as described above. This configuration is particularly useful for probing very narrow features at the bottom edges of somewhat wider holes, for example, punch through occurring at the corner of a narrow trench, which occurs in semiconductor processing.

Although the above description includes a support structure formed from a quartz fiber, it is known that the preferential etching of<111>planes of <001>-oriented silicon can form pyramids having an apex angle of 2θ=70.5°, which is equivalent to a slope of 54.74° from the plane. Often a thin layer of silicon nitride is coated on the silicon pyramid. After cutting, a square end surface is formed. The underlying silicon is very easily mounted to the AFM probe. Cheung et al. describe a method of cutting a flat surface at the pyramid apex by dragging the pyramid across a hard surface. Such a surface may not be completely flat but most probably deviates by less than 100 from a planar surface. The support structure may be composed of other materials.

Nickel is not the only possible material for catalyzing nanotube growth. Iron and iron oxide have been used. Cobalt can also be used as a catalyst. All these catalyzing materials can be used with the processes described herein.

None of the steps described above are particularly difficult or problematic. FIB milling has been shown to be easily and reliably performed. Thereby, probe tips produced according to the invention are relatively economical. Further, the sputter coating and isotropic etching can be simultaneously performed upon a large number of probe tips mounted on a common tip holder, thereby further improving the efficiency of the fabrication method of the invention.

The carbon nanotubes produced according to this embodiment are grown on substantially planar and well defined areas of nickel or other catalyzing material. Thereby, the tip diameter and orientation are well controlled. Carbon nanotube tips have the well-known characteristics of high stiffness and toughness to wear under continued use.

In another preferred embodiment of the invention described and claimed herein, a catalyst material can be directly deposited onto a structure, such as a probe support, using charged particle beam deposition, such as electron beam deposition. In electron beam-induced deposition, as is well-known in the art, a material can be deposited onto a substrate surface using a gas that decomposes in the presence of the electron beam and deposits material onto the surface.

According to a preferred embodiment, a probe support with sloping sides and a generally planar end is prepared as discussed above. An electron beam system, such as a scanning electron microscope, is used to scan a finely focused beam of electrons across the desired portion of the surface of the planar end of the probe support. Typically the precursor gas is directed onto the work piece surface, usually via a fine needle inserted near the position of the electron beam. The gas is broken down into volatile and non-volatile components by the electrons in the beam or possibly by secondary electrons generated when the electron beam strikes the surface. The non-volatile component is deposited onto the surface, while the volatile component is pumped away. For example, Di-cobalt Octa Carbonyl gas will result in a layer of Cobalt deposited onto the surface, while gases in the Nickel acetyl acetonate family, Nickel cyclopentadienyls, Tri phenyl phosphine (TPP) Nickel compounds, TPP Nickel carbonyl compounds, or Nickel carbonyls could be used for nickel deposition.

Electron beam deposition allows the location, shape, orientation, and thickness of the deposited catalyst to be precisely controlled. The catalyst can be deposited in a layer with a very small diameter, typically from 5 to 25 nm. This small diameter of such a catalyst "dot" helps ensure that only a single carbon nanotube will be grown at the desired location. Where a catalyst layer is deposited, for example, upon the planar end of a probe support as discussed above, the catalyst layer can be deposited over the entire planar end or only on a portion of the planar end.

Figure 10:
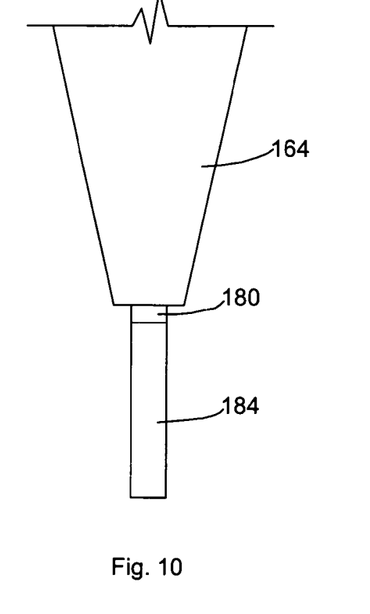
FIG. 10 is a cross-sectional view showing a nanotube grown on a catalyst dot that covers only a portion of the planar end of the probe support.

FIG. 10 is a cross-sectional view showing a catalyst dot 180 that covers only a portion of the planar end of the probe support 164. According to the embodiment of the invention illustrated in FIG. 10, where a catalyst dot is deposited so as to cover only a portion of the surface of a substrate, such as the planar end of a probe support, the catalyst dot will preferably be deposited in a thin film with a substantially uniform thickness, producing a planar catalyst layer surface which is substantially parallel to the surface of the substrate. As shown in FIG. 10, this will typically result in a nanotube 184 that is oriented perpendicular to the probe support and catalyst surfaces and parallel to the longitudinal axis of the probe support 164. The catalyst dot will typically be round in shape, and as also shown in FIG. 10, the outer diameter of the catalyst dot 180 will substantially correspond to the diameter of a nanotube 184 grown on the catalyst. For a non-round catalyst layer, the diameter of a nanotube grown on that catalyst will be substantially equal to the minimum lateral dimension of the layer.

Through the use of a tilting work piece stage, as is well known in the art, the catalyst can be deposited on a probe support surface at any angle. For example, in FIG. 9, as discussed above, the planar end of shaped tip 64" is not perpendicular to the longitudinal axis of the shaped tip 64". In order to deposit a catalyst layer on such an angled surface, the work piece stage can be tilted so that the electron beam is normal to the angled surface.

Figure 11:
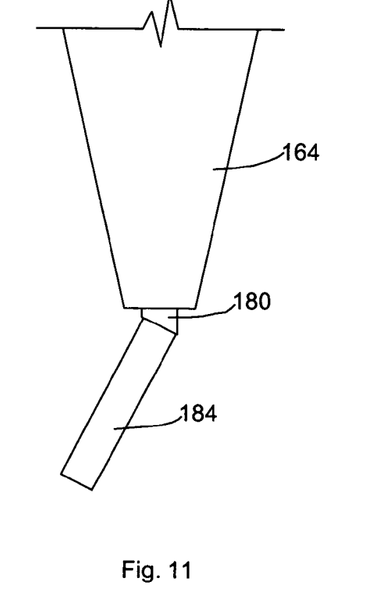
FIG. 11 is a cross-sectional view showing another embodiment of the invention.

In another preferred embodiment, the orientation of the nanotube can be further controlled by depositing a catalyst layer so that the surface of the catalyst layer is not parallel to the planar surface of the probe support. FIG. 11 shows a catalyst layer 180 that is not of substantially uniform thickness. Instead, the catalyst layer 180 shown in FIG. 11 is thicker on one side and thinner on the other. This causes the surface of the catalyst layer to be angled with respect to the planar surface of the probe support 164. Alternatively, an additional layer of a second material could be deposited onto the probe support so that the surface of the additional layer is not parallel to the planar surface of the probe support, and the catalyst deposited on top of the additional layer. Because the growth of a nanotube will be substantially perpendicular to the catalyst surface, a sloped catalyst layer (or a uniform catalyst layer deposited onto a sloped layer of a second material) would allow the growth of a nanotube 184 at any desired angle, even if the planar surface of the probe support were at some other angle. Although the catalyst can be deposited to produce a catalyst surface of any desired geometry, it is advantageous in controlling nanotube orientation if the catalyst surface is substantially planar.

Figure 12:
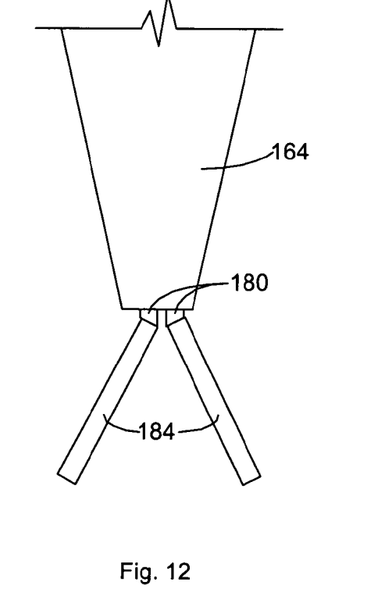
FIG. 12 is a cross-sectional view showing two nanotubes grown on two catalyst dots deposited on the planar end of the probe support.

Skilled persons will recognize, however, that there may be some applications where a non-planar catalyst surface is desirable. For example, a relatively large catalyst layer with a rounded surface could be used to produce a structure shaped much like a medieval mace with numerous nanotubes growing at different angles. Skilled persons will also recognize that electron beam deposition of the catalyst layer allows, for example, more than one catalyst dot to be deposited on a single probe support. This would result in multiple nanotubes and allow for precise control of the number and orientation of each nanotube. FIG. 12 is a cross-sectional view showing two catalyst dots 180 deposited on the planar end of the probe support 164, each catalyst dot having a planar catalyst surface that is angled with respect to the probe support surface and with respect to the surface of the other catalyst dot. As shown in FIG. 12, this allows the growth of two nanotubes 184 on the probe support 164, each nanotube with a different orientation from the other nanotube.

Figure 13:
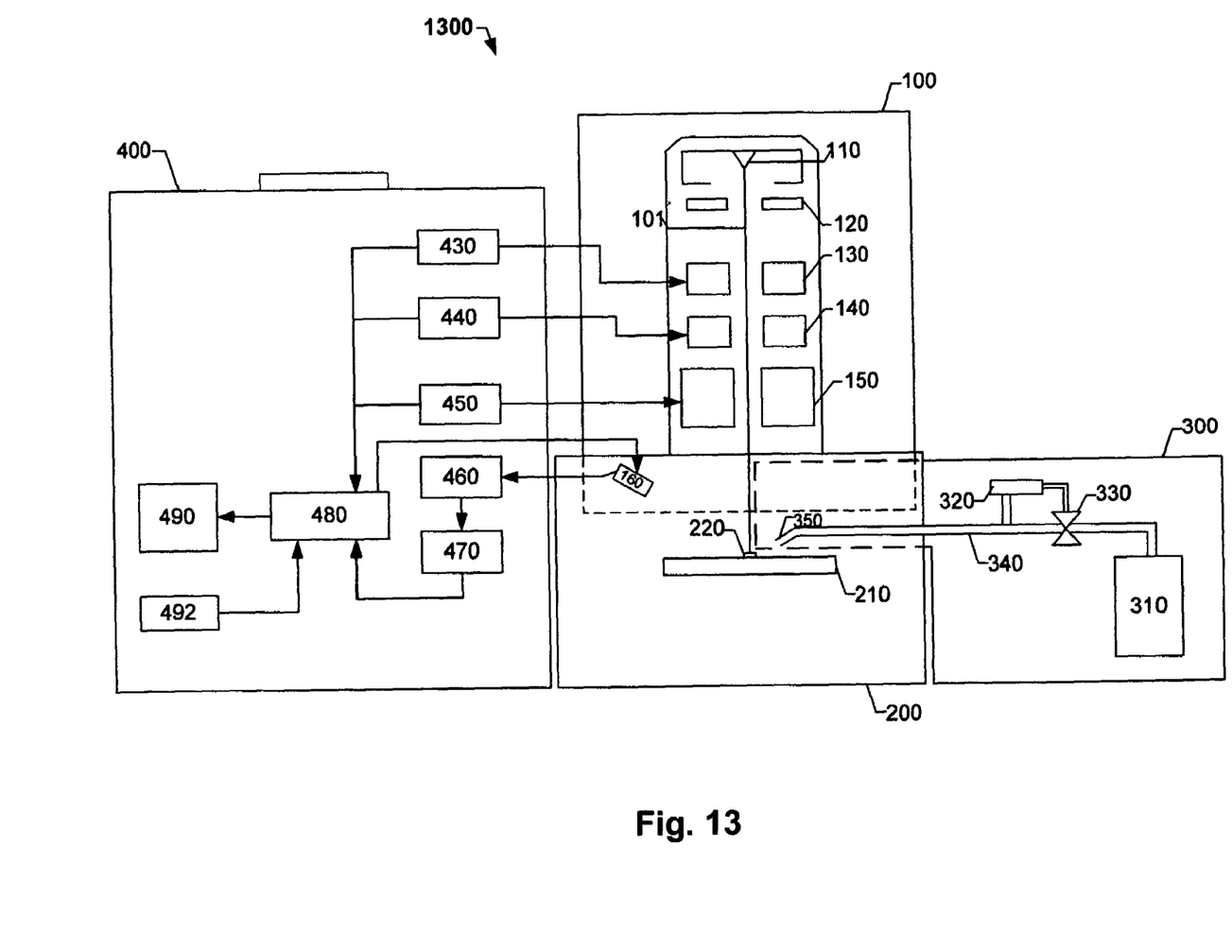
FIG. 13 shows an electron beam system for carrying out the present invention.

FIG. 13 depicts one embodiment of an electron beam system 1300 for carrying out the present invention. The electron beam system depicted in FIG. 13 includes an electron beam column 100, a specimen vacuum chamber 200, a reactant material delivery system 300, and a user control station 400.

An electron beam 101 is emitted from a cathode 110 by applying voltage between cathode 110 and an anode 120. Electron beam 101 is focused to a fine spot by means of a condensing lens 130 controlled by a condensing lens control circuit 430 and an objective lens 150 controlled by an objective lens control circuit 450. Electron beam 101 is scanned two-dimensionally on the specimen by means of a deflection coil 140 controlled by a deflection control circuit 440. Operation of condensing lens control circuit 430, objective lens control circuit 450, and deflection coil control circuit 440 is controlled by the control unit 480.

Electron beam 101 is focused onto a workpiece 220, such as a photolithography mask having a metallic film absorber material patterned on a substrate. Workpiece 220 is located on a movable stage 210 within the specimen vacuum chamber 200. The specimen vacuum chamber 200 includes a charge neutralization system 170 and further includes a secondary electron detector 160 for detecting secondary particles suitable for generating an image of the workpiece. The operation of charge neutralization system 170 and secondary electron detector 160 is controlled by the control unit 480. Secondary electron detector 160 is also connected to an amplifier 460. The amplified signals are converted into digital signals and subjected to signal processing by the signal processor unit 470. The resulting digital signal is used by control unit 480, such as a CPU, in coordination with signals from deflection control 440 and to display an image of workpiece 220 on the monitor 490.

Control unit 480 coordinates deflection control 440 with the image displayed on monitor 490 so that, for example, an operator can use an input device 492 to indicate on monitor 490 an area over which to scan the beam. Control unit 480 can then cause deflection control unit 480 to apply appropriate voltages to deflection coil 140 to scan the beam in accordance with operator input. Control unit 480 can also automatically or semi-automatically interpret input from secondary electron detector 160 to differentiate between types of materials on the surface of workpiece 220 and can then determine an area to be scanned and direct deflection control unit 480 to scan the determined area.

The depicted reactant material delivery system 300 includes a reservoir 310 connected to a delivery conduit 340 that has a distal portion formed as a nozzle for delivering reactant materials to the surface of workpiece 220. The depicted reactant delivery system 300 includes a manometer 320 coupled to delivery conduit 340 for measuring the delivery pressure within delivery conduit 340 of any reactant materials being delivered to the surface of workpiece 220. Manometer 320 further couples to the motorized valve element 330. Motorized valve element 330 is selectively controllable for increasing or reducing the flow of reactant materials of reservoir 310 through delivery conduit 340. The arrangement of manometer 320 and motorized valve element 330 depicted in FIG. 13 forms a feedback control system, wherein manometer 320 measures the delivery pressure within delivery conduit 340 and selectively controls motorized valve element 330 to increase or decrease the flow of reactant material to thereby maintain a selected delivery pressure.

A suitable electron beam system would be, for example, Dual beam FIB/SEM Model DB235, which is commercially available from FEI Company, Hillsboro, Oregon, the assignee of the present application. A preferred type of gas delivery system is described in more detail in U.S. Pat. No. 5,149,974 to Kirch et al. for "Gas Delivery for Ion Beam Deposition and Etching." Other gas delivery systems, such as those described in U.S. Pat. No. 5,851,413 to Casella et al. for "Gas Delivery Systems For Particle Beam Processing" or in U.S. Pat. No. 5,435,850 to Rasmussen for a "Gas Injection System," can be used. Any type of gas delivery system can be used if it delivers an appropriate amount of the gas to the workpiece surface while maintaining an adequate vacuum for the electron beam. For example, the gas supply may be located inside or outside the vacuum chamber.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of forming a probe tip, comprising the steps of:
   providing a probe tip support member;
   directing a charged particle beam activated gaseous material toward a surface of said probe tip support member; and
   scanning a charged particle beam over said surface, the charged particle beam inducing a reaction with the charged particle beam activated gas to deposit a catalyst layer, said catalyst layer comprising a material capable of catalyzing the growth of a nanotube; and
   growing a nanotube on the catalyst layer in a process catalyzed by said material.

2. The method of claim 1 which providing a probe tip support member comprises providing a probe tip support member having at one end a substantially planar surface.

3. The method of claim 1 wherein said catalyst layer has a substantially non-uniform thickness.

4. The method of claim 1 wherein said catalyst layer has a substantially planar surface which is not parallel to the planar surface of said probe tip support member.

5. The method of claim 4 wherein said nanotube extends in a direction substantially perpendicular to the surface of said catalyst layer.

6. The method of claim 2 in which providing a probe tip support member comprises providing a support of a first material and depositing a layer of a second material onto a surface of said support.

7. The method of claim 6 in which depositing said catalyst layer comprises depositing said catalyst layer onto said layer of a second material.

8. The method of claim 6 wherein said layer of a second material has a substantially non-uniform thickness.

9. The method of claim 6 wherein said layer of a second material has a substantially planar surface which is not parallel to the planar surface of said probe tip support member.

10. The method of claim 9 wherein said nanotube extends in a direction substantially perpendicular to the surface of said catalyst layer.

11. The method of claim 1 in which providing a probe tip support member comprises providing a probe tip support member having at one end a substantially planar surface by cutting a tapering probe tip support member at a position to provide a substantially planar surface of a particular size.

12. The method of claim 11 in which cutting a tapering probe tip support member at a position to provide a substantially planar surface of a particular size comprises charged particle beam milling.

13. The method of claim 1 in which said charged particle beam activated gaseous material comprises an electron beam activated gaseous material and in scanning a charged particle beam over said planar surface comprises scanning an electron beam over said planar surface.

14. The method of claim 1, wherein said material capable of catalyzing the growth of a nanotube comprises cobalt, metallic nickel, a nickel oxide, metallic iron or an iron oxide.

15. A probe tip, comprising:
   a support including a shaped tip having a substantially planar end;
   a first catalyzing layer of material capable of catalyzing growth of a nanotube covering a first portion of the surface of said planar end, said first catalyzing layer having a substantially non-uniform thickness; and
   a first nanotube formed on said first catalyzing layer, wherein said first catalyzing layer has a substantially planar surface which is not parallel to the planar end of said support.

16. The probe tip of claim 15 wherein said first catalyzing layer has a diameter of 5 to 25 nm.

17. The probe tip of claim 15 further comprising one or more additional nanotubes formed on said first catalyzing layer.

18. The probe tip of claim 15 further comprising:
   a second catalyzing layer of material capable of catalyzing growth of a nanotube covering a second portion of the surface of said planar end;
   said second catalyzing layer having a substantially planar surface which is not parallel to the surface of said first catalyzing layer.

19. The probe tip of claim 15 wherein said nanotube extends in a direction substantially perpendicular to the surface of said first catalyzing layer.

20. The probe tip of claim 15, further comprising:
   a second catalyzing layer of material capable of catalyzing growth of a nanotube covering a second portion of the surface of said planar end; and
   a second nanotube formed on said second catalyzing layer.

21. The probe tip of claim 20 wherein said first catalyzing layer and said second catalyzing layer are spaced apart.

22. A method of forming a probe tip, comprising:
   providing a probe tip support member having at one end a substantially planar surface, the probe tip including a support member having sidewalls that slope away from the planar surface;
   said probe tip support member formed by flattening an end of a tapering probe tip support member using charged particle beam milling in order to provide a substantially planar surface of a particular size;
   anisotropically depositing a catalytic material capable of catalyzing the growth of a nanotube onto the planar surface and the sidewalls;
   etching said catalytic material to remove said catalytic material from the sidewalls while leaving a thickness of the catalytic material on the planar surface; and
   growing a nanotube on the catalyst in a process catalyzed by said material.

23. A method of forming a probe tip, comprising:
   providing a probe tip support member having at one end a substantially planar surface;
   said probe tip support member formed by flattening an end of a tapering probe tip support member using charged particle beam milling in order to provide a substantially planar surface of a particular size;
   directing a charged particle beam activated gaseous material toward said planar surface; and
   scanning a charged particle beam over said planar surface, the charged particle beam inducing a reaction with the charged particle beam activated gas to deposit a catalyst on the planar surface, said catalyst comprising a material capable of catalyzing the growth of a nanotube
   growing a nanotube on the catalyst in a process catalyzed by said material.

24. The method of claim 23 in which said charged particle beam activated gaseous material comprises an electron beam activated gaseous material and in scanning a charged particle beam over said planar surface comprises scanning an electron beam over said planar surface.

25. The method of claim 23 in which in which providing a probe tip support member having at one end a substantially planar surface includes providing a support member having sidewalls that slope away from the planar surface.

26. The method of claim 23 in which providing a probe tip support includes providing a support member in the form of a truncated cone.

27. The method of claim 23 in which providing a probe tip support member includes cutting a tapering probe tip support member to provide a first surface having a desired diameter and angle for growing a nanotube.

28. A method of forming a probe tip, comprising:
providing a probe tip support member having at one end a substantially planar surface and having sidewalls that slope away from the planar surface;
said probe tip support member formed by cutting a tapering probe tip support member at a position to provide a substantially planar surface of a particular size;
said probe tip support having a longitudinal axis running from the planar surface of said support through the center of said support and in which cutting the tapering probe tip support member at a position to provide a planar surface of a desired size includes cutting the probe tip support member to provide a planar surface that is not perpendicular to the longitudinal axis;
anisotropically depositing a catalytic material onto the planar surface and the sidewalls; and
etching said catalytic material to remove said catalytic material from the sidewalls while leaving a thickness of the catalytic material on the planar surface
growing a nanotube on the catalyst in a process catalyzed by said material.

29. A method of forming a probe tip, comprising:
providing a probe tip support member having at one end a substantially planar surface;
said probe tip support member formed by cutting a tapering probe tip support member at a position to provide a substantially planar surface of a particular size;
said probe tip support having a longitudinal axis running from the planar surface of said support through the center of said support and in which cutting the tapering probe tip support member at a position to provide a planar surface of a desired size includes cutting the probe tip support member to provide a planar surface that is not perpendicular to the longitudinal axis;
directing a charged particle beam activated gaseous material toward said planar surface;
scanning a charged particle beam over said planar surface, the charged particle beam inducing a reaction with the charged particle beam activated gas to deposit a catalyst on the planar surface, said catalyst comprising a material capable of catalyzing the growth of a nanotube; and
growing a nanotube on the catalyst in a process catalyzed by said material.

30. The method of claim 29 which said charged particle beam activated gaseous material comprises an election beam activated gaseous material and in scanning a charged particle beam over said planar surface comprises scanning an electron beam over said planar surface.

31. A probe tip assembly fanned in accordance with the method of claim 29.

32. The method of claim 29 which in which providing a probe tip support member having at one end a substantially planar surface includes providing a support member having sidewalls that slope away from the planar surface.

33. The method of claim 32 in which providing a probe tip support includes providing a support member in the form of a truncated cone.

34. The method of claim 32 in which providing a probe tip support member includes cutting a tapering probe tip support member to provide a first surface having a desired diameter and angle for growing a nanotube.

* * * * *